United States Patent [19]

Gruner et al.

[11] 3,767,274

[45] Oct. 23, 1973

[54] AUTOMATIC LOAD-DEPENDENT BRAKING FORCE REGULATOR

[75] Inventors: Hans Gruner; Heinz Nicolay, both of Heidelberg, Germany

[73] Assignee: Graubremse GmbH, Heidelberg, Germany

[22] Filed: Jan. 20, 1972

[21] Appl. No.: 219,380

[30] Foreign Application Priority Data

Feb. 1, 1971 Germany .................. P 21 04 539.6

[52] U.S. Cl. .............................. 303/22 R, 303/60

[51] Int. Cl. ............................................ B60t 8/22

[58] Field of Search ................. 303/22 R, 22 A, 40, 303/60

[56] References Cited

UNITED STATES PATENTS

| | | | |
|---|---|---|---|
| 3,285,674 | 11/1966 | Eaton | 303/22 R X |
| 3,341,258 | 9/1967 | Dobrikin et al. | 303/22 R X |
| 3,404,922 | 10/1968 | Valentine | 303/22 R X |

*Primary Examiner*—Duane A. Reger
*Attorney*—Werner W. Kleeman

[57] ABSTRACT

A regulator for fitting between a vehicle axle and the vehicle body for automatically regulating the braking effort by reference to the vehicle load, said regulator being incorporated in use, in a line connecting a brake valve with a brake actuating cylinder. The regulator comprises a casing containing a control piston which is shiftable according to the vehicle load, and which varies the ratio of the pressure admitted through the brake valve to the pressure delivered to the brake cylinders. The control piston is preceded by a free auxiliary piston to which the pressure admitted by the brake valve is likewise applied such that the pistons are urged towards one another. A variable transmission is interposed between the control piston and the free auxiliary piston and serves to vary the ratio of the admitted pressure to the delivered pressure according to the vehicle load.

18 Claims, 3 Drawing Figures

Patented Oct. 23, 1973 3,767,274

AUTOMATIC LOAD-DEPENDENT BRAKING FORCE REGULATOR

BACKGROUND OF THE INVENTION

The present invention broadly deals with a new and improved automatic load-dependent braking force regulator, and more specifically relates to a novel construction of regulator secured between a vehicle axle and a vehicle body and functionally interposed between a brake valve and a wheel brake actuating cylinder for automatically regulating the braking effort or force as a function of vehicle load.

Prior art regulators of this general type, for instance as exemplified by West German Pat. 1,185,076 and 1,231,584, embody diaphragms having variable effective surfaces or areas. These diaphragms bear upon a fixed annular member as well as upon radial fingers or ribs provided on a valve casing. The diaphragm constitutes a control piston which can be varied as a function of vehicle load, and which in accordance with its momentary position varies the ratio of the pressure admitted through the brake valve and the pressure delivered to the brake actuating cylinder. These state-of-the-art regulators utilized for controlling the braking force or effort are very complex in design and also subject to considerable wear. Consequently, they are not only costly to fabricate but their functional reliability is not very great.

SUMMARY OF THE INVENTION

Accordingly, from what has been stated above it will be recognized that the prior art is still in need of regulator equipment for automatically regulating the braking effort as a function of vehicle load which is not associated with the aforementioned drawbacks and limitations of the state-of-the-art constructions. Hence, a primary objective of the present invention is to provide a novel construction of automatic load-dependent braking force regulator which effectively and reliably fulfills the existing need in the art and is not associated with the aforementioned drawbacks and limitations of the prior art equipment of this character.

Still another and more specific object of the present invention relates to a new and improved construction of braking effort regulator of particularly simple design and high operational reliability and which is also relatively inexpensive to fabricate.

Now, in order to implement these and still further objects of the invention, which will become more readily apparent as the description proceeds, the inventive regulator comtemplates the provision of a control piston which is slidable within a casing or housing and preceded by a free auxiliary piston to which the pressure admitted by the brake valve is likewise applied. A variable transmission is interposed between the control piston and the free auxiliary piston for the purpose of varying the ratio of the admitted to the delivered pressure in accordance with vehicle load. In a preferred physical manifestation of the invention the variable transmission is preferably constituted by levers, discs or similar interposed elements which are deflectable or pivotable in the direction of piston displacement about pivots fixed in relation to the displaceable pistons and which bear against the control piston as well as the free auxiliary piston. The invention contemplates constructing and disposing the interposed intermediate elements in such a manner that their transmission ratio changes in functional dependence upon piston displacement. With particular advantage the control piston which slides within its casing may carry a hollow cylinder at its centre or central region and the annular free auxiliary piston which likewise slides within the casing may simultaneously slide upon this hollow cylinder. Within the hollow cylinder the control piston may contain or form a throughpassage valve seat for a spring-loaded valve member, a control valve slide simultaneously also extending into this valve seat. The control valve slide together with the valve member forms an air outlet or discharge valve. The control valve slide or slide piston is displaceable by means of the regulator control linkage as a function of the vehicle load.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
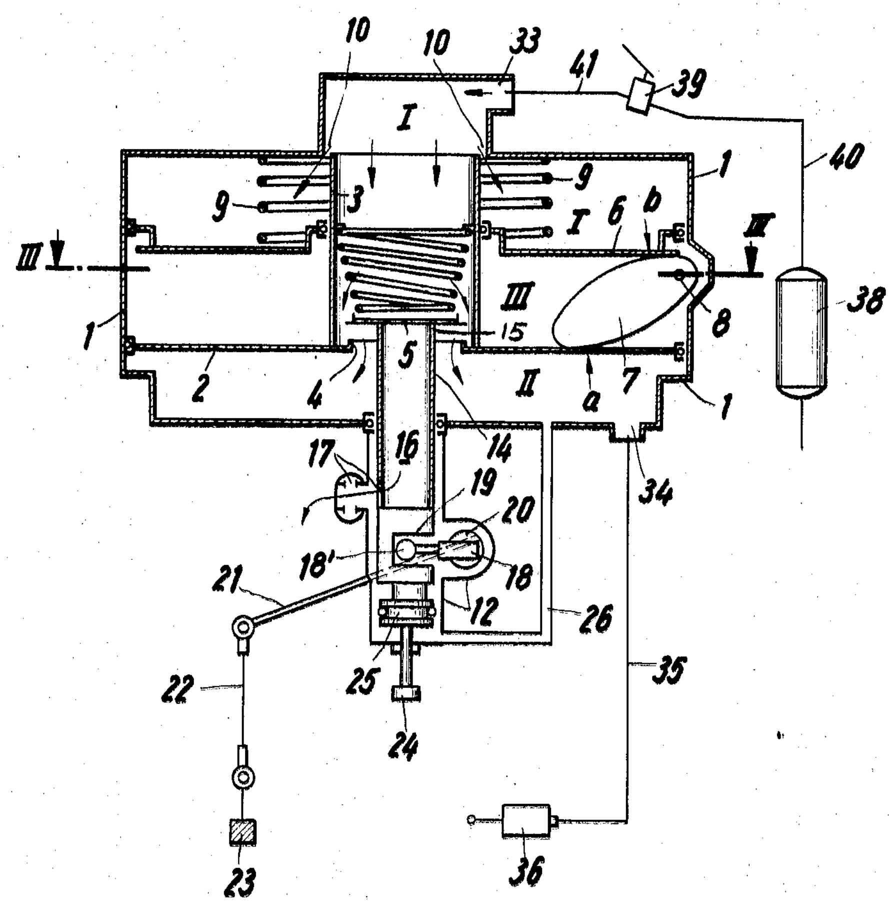
FIG. 1 is a longitudinal sectional view of a braking force or braking effort regulator designed according to the teachings of the present invention and operable by a mechanical linkage.
Figure 3:
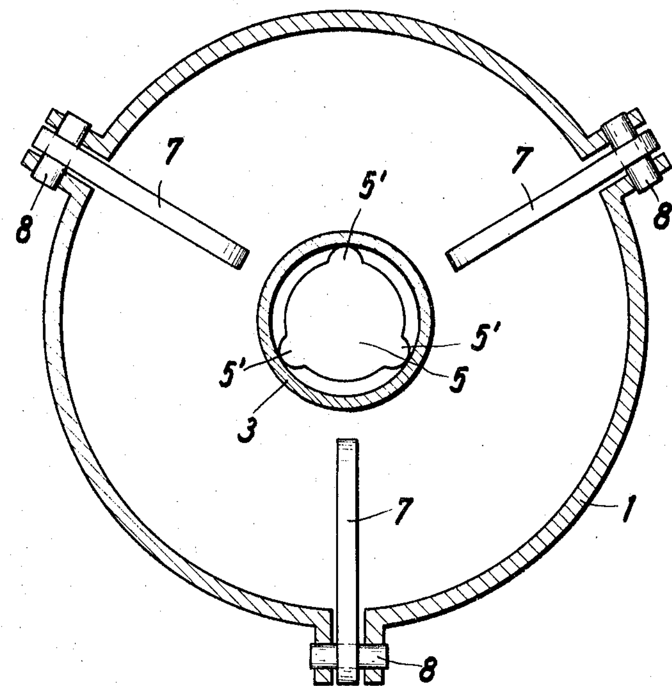
FIG. 3 is a sectional view of the braking effort regulator depicted in FIG. 1, taken substantially along the line III-III thereof.

Considering now the drawings, and turning attention initially to the exemplary embodiment of braking effort regulator as depicted in FIGS. 1 and 3 it will be seen that such comprises a control piston 2 which is sealingly slidable within the bottom portion or part of a casing or housing 1. The centre or central region of this control piston 2 contains a hollow cylinder 3 forming a ring-shaped throughpassage valve seat 4 for a spring-loaded valve member 5. An annular auxiliary piston 6 loaded from above by a spring 9 is adapted to freely slide within the casing 1 and upon this hollow cylinder 3.

In the embodiment of proposed braking force or braking effort regulator as depicted in FIG. 1 three transmission members are interposed between and circumferentially distributed about the two pistons 2 and 6. These interposed transmission members, in the embodiment under consideration, possess the form of oval discs 7 which can freely pivot up and down upon pivot pins 8 fixedly mounted in the casing externally of the cylindrical or travelling surfaces upon which slide the pistons 2 and 6. These oval discs 7 will be seen to be disposed in an upright position so as to bear with their peripheral edge against the confronting faces of the pistons 2 and 6.

Figure 2:
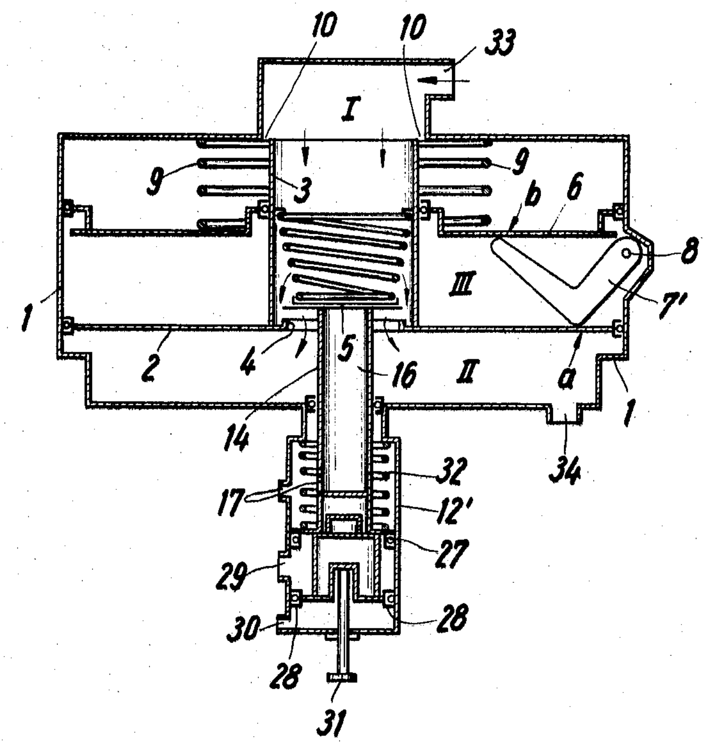
FIG. 2 is a longitudinal sectional view of a modified constructional form of inventive braking effort or braking force regulator, similar to the showing of FIG. 1, but in this case operable by compressed air.

In the modified arrangement depicted in FIG. 2 the oval discs 7 are replaced by angled or cranked levers 7' which as far as their functionality is concerned have the same effect as the oval discs. Regardless of which constructional form of transmission member is employed these interposed members 7 and 7', as indicated above, bear against the confronting faces of the two pistons 2 and 6. Further, when the two pistons 2 and 6 are displaced the position of the points of contact between the members 7, 7' and the pistons 2 and 6 likewise changes. For instance, the contact point *a* on piston 2 will move radially outwards and the contact point *b* on the auxiliary piston 6 will move radially inwards when the two pistons 2 and 6 are displaced in the upward direction. Since the positions of the pivot pins 8 remain fixed the effective transmission ratio of axial thrust between the two pistons necessarily varies. The spring 9 continuously urges the piston arrangement into its starting position near the bottom or lower end of the casing or housing 1.

Continuing, it will be recognized that the pistons 2 and 6 subdivides the casing 1 into three chambers I, II and III. Moreover, the inlet opening or inlet connection 33 of the casing 1 communicates through a conduit or line 41 with a brake valve 39 which, in turn, is connected through the agency of a conduit or line 40 with a pressure or supply reservoir 38.

Additionally, an outlet opening or outlet connection 34 located at the bottom region of the casing 1 communicates via a conduit or line 35 with the brake actuating cylinders or cylinder means 36. A conventional compresser which has not been particularly shown in the drawing supplies compressed air to the pressure or supply reservoir 38. When the brake valve 39 is operated, for instance by means of the not particularly referenced brake pedal shown in FIG. 1, compressed air enters chamber I through the line or conduit 41 and the inlet connection 33, as indicated in FIG. 1 by the sequence of associated arrows. The pressure of the air passing through the gap at location 10 therefore acts on one face of the auxiliary piston 6. Since the pistons 2 and 6 are in their lowermost end position the throughpassage opening through the valve seat 4 provided at the control piston 2 is not closed by the valve member 5. Consequently, compressed air from the chamber I can also enter the chamber II through the opened valve seat 4 and thus applies pressure to the underside or bottom face of the control piston 2. Naturally, compressed air leaving through the outlet or discharge opening 34 also enters the conduit or line 35 and the brake actuating cylinders 36. The pressure in chamber II (effective braking pressure) displaces the control piston 2 upwards within the casing 1 against the transmission members 7 or 7' situated within chamber III. Consequently the points of contact *a* and *b* of the transmission members 7 or 7' with the two pistons 2 and 6 will shift until the resultant transmission ratio is such that the thrust of the braking pressure in chamber II and hence in the brake actuating cylinders can balance the thrust of the braking pressure in chamber I.

The load of the vehicle affects the functioning of the braking effort or braking force regulator because the bottom of the casing 1 slidably contains a slide valve or a slide piston 14 which is traversed by a central open-ended bore 16 with the open upper end 15 forming a valve seat which carries the previously mentioned valve member 5. The valve slide 14 in conjunction with the valve member or valve plate 5 forms an air discharge or outlet valve while the valve member 5 in conjunction with the valve seat 4 of the control piston 2 forms an air throughpassage valve. Both of these valves form a double valve arrangement which cooperates with the same valve plate or valve member 5. On the other hand, it should be recognized that the bore 16 in the valve slide or valve piston 14 communicates through the agency of the exhaust orifice or ports 17 with the outside, thus permitting air to escape in the direction indicated by the associated arrows of FIG. 1.

The valve slide 14 is displaceable in accordance with the load carried by the vehicle. For this purpose a pivot pin 20 is mounted in a part or portion 12 of the casing 1 containing the valve slide or valve piston 14. Fitted into the pivot pin 20 within the casing 1 is a lever arm 18 which has a ball head 18' in engagement with a recess 19 provided at the valve slide 14, as shown. On the outside of the casing part 12 the pivot pin 18 carries a universally deflectable lever arm 21 at the end of which is a coupling rod 22 of adjustably variable length. The free end of this coupling rod 22 is attached to a vehicle axle 23.

Generally the casing 1 of the braking effort regulator will be affixed to the body of the vehicle and it will thus be understood that any change in the distance between the vehicle body and the vehicle axle will result in the linkage 21, 22 turning the pivot pin 20 for lifting or lowering the end of the valve slide or piston 14 inside the casing 1.

When the vehicle is heavily loaded the valve slide 14 will project far into the casing and lift the valve member 5 well above its valve seat 4, so that the air inlet valve will remain open a long time before the pressure admitted by the brake valve 39 has sufficiently lifted the piston assembly for the valve seat 4 to make contact with the valve member 5 and this air valve to be closed. The transmission members 7 or 7' working in the chamber III, and frictionally contacting the piston members, will have been deflected through angles about their pivots at which the ratio of the opposing pressures in chambers I and II is regulated to a degree appropriate for the existing load carried by the vehicle.

It should be readily understood that a low vehicle load will cause valve slide 14 to project less far into the braking effort regulator and that correspondingly the air valve 4, 5 will close sooner at a time when the pressure ratio determined by the transmission members 7 or 7' is appropriate for this lighter vehicle load.

Since in different vehicles the braking pressures and the spring deflections may also be different, the braking effort regulator can be adjusted from the outside to the desired braking pressure by setting or adjusting a regulating screw 24, because the braking pressures for the empty and the fully laden vehicle are known. The adjusting screw 24 varies the lower or bottom end position of the valve slide 14. This position corresponds to the braking pressure when the vehicle is empty. Starting from this end or terminal position any load deposited upon the vehicle will change the position of the valve slide 14 into a new position that corresponds to the load owing to the deflection of the linkage system 18 – 22.

On the other hand, when the brake is released and the chamber I is exhausted the piston assembly 2 and 6 can sufficiently rise for the valve member 5 to be lifted-off its seat 15 on the valve slide or valve piston 14, thereby also permitting the chamber II to be exhausted through the bore 16 and the outlet at 17.

In order to maintain the valve slide 14 in equilibrium when exposed to pressure in the chamber II or to expose it to only slight excess pressure from above the bottom part 12 of the casing 1 contains a piston 25 interposed between the adjusting screw 24 and the valve slide 14, the pressure in chamber II being also applied to this piston through a line or conduit 26.

The braking force or braking effort regulator illustrated in FIG. 2 is intended for vehicles equipped with a compressed air type suspension system. The construction of the regulator in such case is the same as that of the embodiment disclosed and discussed in conjunction with FIG. 1, with the exception that the valve slide 14 is not displaced by a mechanical linkage but in this case by the pressure existing in the bellows type suspension units of the vehicle. According to the number of compressed air suspension units with which the vehicle is equipped a piston 27 loaded by a spring 32 is provided in the bottom part 12 of the valve casing 1 for displacing the valve slide or valve piston 14. The spring 32 is designed or selected such that it causes the valve slide 14 to assume its starting position at the pressure which prevails when the vehicle is unloaded.

A further piston 28 is provided below the piston 27, connections 29 and 30 being located above and below this piston 28 and communicating with the suspension units or air bellows. Moreover, this piston 28 again rests upon an adjusting screw 31 which permits the braking pressure to be adjusted when the vehicle is without load. Otherwise the braking effort regulator of FIG. 2 functions in exactly the same manner as that described with regard to FIG. 1, the only difference being in the use of the pressure existing in the bellows type suspension units for controlling the regulator.

Now with respect to FIG. 3 it should perhaps also be here mentioned that the valve member 5 is provided with a number of circumferential projections 5' or like protuberances to ensure that it is guided centrally within the hollow cylinder 3 without interfering with the free passage of air.

The controlled braking pressure, as will be understood, depends upon the pressure ratio that is adjusted by the transmission members 7 or 7'. When the vehicle is empty the braking pressure will be relatively low. In such case the radial distance between the contact points *a* and *b* is a maximum. The highest braking pressure, i.e., when the vehicle is fully loaded, will be applied when the two contact points *a* and *b* are axially in alignment or closely juxtapositioned in superimposed relationship when viewed in the axial direction of the two pistons 2 and 6. In either case the braking pressure in chamber II will also be applied to the balancing or compensation piston 25 through the line or conduit 26 and the pressure in the chamber II which opposes the required displacement of the valve piston or valve slide 14 will thus be compensated. The linkage 18 – 22 therefore need not overcome substantial reactive forces. On the other hand, the dimensions or cross-sections of the valve slide 14 and the balancing piston 25 are chosen such that the valve slide 14 will assume the "fully laden" position for the application of the maximum braking effort in the event the linkage 21, 22 is fractured.

While there is shown and described present preferred embodiments of the invention, it is to be distinctly understood that the invention is not limited thereto but may be otherwise variously embodied and practiced within the scope of the following claims. Accordingly,

What is claimed is:

1. A braking effort regulator capable of being mounted between a vehicle axle and a vehicle body for automatically regulating the braking effort as a function of the vehicle load, said braking effort regulator being incorporated in use, in a line connecting a brake valve with brake actuating cylinder means, said braking effort regulator comprising a casing, a control piston shiftable within said casing as a function of vehicle load, the momentary position of said control piston varying the ratio of the pressure admitted through the brake valve to the pressure delivered to the brake actuating cylinder means, a freely movable auxiliary piston located forwardly of said control piston within said casing and to which there is applied the pressure admitted by the brake valve, such that said control piston and auxiliary piston are urged towards one another, and at least one variable transmission interposed between said control piston and said auxiliary piston in pivotable contact therewith for varying the ratio of the admitted pressure to the delivered pressure as a function of vehicle load.

2. A braking effort regulator capable of being mounted between a vehicle axle and a vehicle body for automatically regulating the braking effort as a function of the vehicle load, said braking effort regulator being incorporated in use, in a line connecting a brake valve with brake actuating cylinder means, said braking effort regulator comprising a casing, a control piston shiftable within said casing as a function of vehicle load, the momentary position of said control piston varying the ratio of the pressure admitted through the brake valve to the pressure delivered to the brake actuating cylinder means, a freely movable auxiliary piston located forwardly of said control piston within said casing and to which there is applied the pressure admitted by the brake valve, such that said control piston and auxiliary piston are urged towards one another, and at least one variable transmission comprising an intermediate member interposed between said control piston and said auxiliary piston for varying the ratio of the admitted pressure to the delivered pressure as a function of vehicle load, said intermediate member bearing against both said control piston and said auxiliary piston, and fixed pivot means which are stationary in relation to said control piston and auxiliary piston for pivotably mounting said intermediate member so as to be deflectable in the direction of piston displacement.

3. The braking effort regulator as defined in claim 2, wherein a plurality of intermediate members are interposed between said control piston and said auxiliary piston.

4. The braking effort regulator as defined in claim 3, wherein each of said intermediate members comprises a pivotably mounted lever.

5. The braking effort regulator as defined in claim 3, wherein each of said intermediate members comprises a pivotably mounted disc.

6. The braking effort regulator as defined in claim 3, wherein said intermediate members bear against confronting faces of said control piston and auxiliary piston.

7. The braking effort regulator as defined in claim 3, wherein said intermediate members each comprises an oval disc pivotably mounted at intervals around the circumference of the control piston and auxiliary piston intermediate thereof so that their peripheral disc edges are in contact with said pistons.

8. A braking effort regulator capable of being mounted between a vehicle axle and a vehicle body for automatically regulating the braking effort as a function of the vehicle load, said braking effort regulator being incorporated in use, in a line connecting a brake valve with brake actuating cylinder means, said braking effort regulator comprising a casing, a control piston shiftable within said casing as a function of vehicle load, the momentary position of said control piston varying the ratio of the pressure admitted through the brake valve to the pressure delivered to the brake actuating cylinder means, a freely movable auxiliary piston located forwardly of said control piston within said casing and to which there is applied the pressure admitted by the brake valve, such that said control piston and auxiliary piston are urged towards one another, and at least one variable transmission comprising an intermediate member interposed between said control piston and said auxiliary piston for varying the ratio of the admitted pressure to the delivered pressure as a function of vehicle load, said variable transmission comprises a plurality of circumferentially distributed identical variable transmission members interposed between said control piston and said auxiliary piston.

9. A braking effort regulator capable of being mounted between a vehicle axle and a vehicle body for automatically regulating the braking effort as a function of the vehicle load, said braking effort regulator being incorporated in use, in a line connecting a brake valve with brake actuating cylinder means, said braking effort regulator comprising a casing, a control piston shiftable within said casing as a function of vehicle load, the momentary position of said control piston varying the ratio of the pressure admitted through the brake valve to the pressure delivered to the brake actuating cylinder means, a freely movable auxiliary piston located forwardly of said control piston within said casing and to which there is applied the pressure admitted by the brake valve, such that said control piston and auxiliary piston are urged towards one another, and at least one variable transmission comprising an intermediate member interposed between said control piston and said auxiliary piston for varying the ratio of the admitted pressure to the delivered pressure as a function of vehicle load, said auxiliary piston is in frictional contact with said variable transmission.

10. The braking effort regulator as defined in claim 9, further including biasing spring means for maintaining said auxiliary piston in contact with said variable transmission.

11. A braking effort regulator capable of being mounted between a vehicle axle and a vehicle body for automatically regulating the braking effort as a function of the vehicle load, said braking effort regulator being incorporated in use, in a line connection a brake valve with brake actuating cylinder means, said braking effort regulator comprising a casing, a control piston shiftable within said casing as a function of vehicle load, the momentary position of said control piston varying the ratio of the pressure admitted through the brake valve to the pressure delivered to the brake actuating cylinder means, a freely movable auxiliary piston located forwardly of said control piston within said casing and to which there is applied the pressure admitted by the brake valve, such that said control piston and auxiliary piston are urged towards one another, and at least one variable transmission comprising an intermediate member interposed between said control piston and said auxiliary piston for varying the ratio of the admitted pressure to the delivered pressure as a function of vehicle load, said control piston carries a hollow cylinder at its inner circumference, and wherein said auxiliary piston slides upon said hollow cylinder.

12. The braking effort regulator as defined in claim 11, wherein said control piston incorporates means forming an annular valve seat within said hollow cylinder, a spring-loaded valve plate cooperating with said annular seat to form therewith a spring-loaded air brake valve, a valve slide provided for said casing control piston and capable of projecting through said annular seat and itself forming an annular valve seat for said valve plate, said valve plate and annular seat of said valve slide forming an air outlet valve, and rod linkage means for displacing said valve slide.

13. The braking effort regulator as defined in claim 12, wherein said air brake valve and said air outlet valve together constitute a double-valve arrangement having a single valve disc defined by said valve plate.

14. The braking effort regulator as defined in claim 12, wherein said valve slide forming said annular seat for said valve plate of said air outlet valve is slidably mounted within an extension of said casing and displaceable by said rod linkage means, adjustable screw means for regulating the starting position of said valve slide.

15. The braking effort regulator as defined in claim 14, further including a balancing piston slidable within said casing extension, said valve slide resting upon said balancing piston, said balancing piston forming with said casing extension a chamber below said balancing piston, said control piston forming with said casing a chamber below said control piston, and means for communicating both said chambers with one another.

16. The braking effort regulator as defined in claim 15, wherein said balancing piston possesses an effective diameter greater than that of said valve slide.

17. The braking effort regulator as defined in claim 16, wherein said rod linkage means to operate said braking effort regulator by displacing said valve slide according to vehicle load is adjustable.

18. The braking effort regulator as defined in claim 14, further including an actuating piston for displacing said valve slide and to which actuating piston there is capable of being applied pressure existing in the air suspension of vehicle equipped with an air suspension system.

* * * * *